United States Patent Office 3,795,558
Patented Mar. 5, 1974

3,795,558
METHOD OF ULTRASONIC SEALING HOLLOW MEMBERS
William C. Dabney and Samuel H. Goodenough, Oakland, and Harold B. Queen, Walnut Creek, Calif., assignors to Cutter Laboratories, Inc., Berkeley, Calif.
Filed Nov. 8, 1971, Ser. No. 196,505
Int. Cl. B32b 31/16; F16l 25/00, 13/14
U.S. Cl. 156—73        10 Claims

ABSTRACT OF THE DISCLOSURE

A method for connecting a relatively rigid member and a relatively flexible member by employing ultrasonic energy, characterized in that an annular axial projection on the rigid member is softened by the application of ultrasonic energy thereto and is simultaneously deformed around a corresponding annular transverse flange on the other member to permanently bond said members together to define a hermetically sealed joint. The invention also relates to the resultant product, which comprises an entry spike-drip barrel device adapted for connection with a container for parenteral solutions, said device including a relatively rigid spike member that is bonded by a hermetic seal with a relatively flexible drip barrel member.

---

Various methods have been proposed in the patented prior art for joining in sealing engagement a plurality of parts to define a unitary member. Among these are: (1) sealing the parts by an adhesive, (2) "cold working" (i.e., physically forging or hammering one part around another), (3) spin-welding, (4) ultrasonic welding, and (5) ultrasonic swaging or staking one part to another.

In the field of medical appliances, as for example in the manufacture of certain synthetic plastic devices, where two or more parts made of materials of differing composition or physical characteristics are sealed together, current practice has been limited to sealing by adhesives. An example of such a device is an entry spike-drip barrel assembly used in the administration of parenteral solutions. The entry spike portion of such an assembly is usually made of a hard, rigid synthetic plastic material [for example, Lexan (polycarbonate polymer)] in order to be able to pierce the rubber closure in a fluid supply container. The drip barrel portion is preferably made of a softer, flexible plastic in order that its sides may be compressed manually for certain purposes during the use of the assembly. To join these two parts in sealing engagement, when they are made of unlike but chemically compatible plastics, one normally applies a solution of an adhesive substance to the abutting surfaces to be sealed and then removes the solvent for the adhesive. This process is time consuming and it also introduces a possible contaminant (i.e., the adhesive, or the solvent which may be trapped in the seal) to contaminate the fluid administered to the patient. Furthermore, polyethylene cannot be used as one of the synthetic plastics since adhesives will not adhere to it.

The "cold working" method is not practical for sealing a rigid plastic member to a flexible plastic member since it is time-consuming and does not guarantee a seal free from leaks. Moreover, the method frequently causes crazing and resulting fracturing of many of the plastics.

Spin-welding can be used only when the two plastic parts are rigid and chemically the same or capable of fusion.

The use of ultrasonic energy for sealing two shaped plastic members has been disclosed previously. It appears that several considerations are important in order to achieve a sealing engagement between two parts in the area where the two parts abut each other. One, the two parts must be in intimate contact with each other and one part must be supported. That is, one part must have a base supporting it and the ultrasonic horn must engage the other part. A second consideration is that the parts should be rigid or at least semi-rigid. If one part is flexible, then the pressure exerted by the ultrasonic horn on one part while the second part is supported by a base would cause undesired deformation of the flexible member, resulting in an imperfect seal. A third consideration is that the two plastic members either should be of the same material or their chemical composition is such that they either combine by chemical interaction or they form a cohesive bond between each other at the time their contacting surfaces flow as a result of heat produced via the sonic energy. Finally, melt temperatures of the two members should be relatively close together.

In some instances, utilizing ultrasonic energy to weld rigid plastics having high melt temperatures has invariably resulted in burning or scarring of the part. In accordance with the present invention, it has been proposed to take advantage of ultrasonic energy for sealing two unlike members, for example, physically unlike synthetic plastic members, one of which is rigid and the other flexible (as in the spike-drip barrel unit described earlier). Such a method has a number of advantages: namely, rapidity with which a unit can be manufactured, elimination of contaminants, utilization of inexpensive plastic parts, and the provision of a joint which has both a strong mechanical seal and a hermetic seal.

It is an object of the present invention to provide an ultrasonic method of sealing which accomplishes the desired objectives: namely, to seal one member to another member when each may be dissimilar in physical or chemical properties to provide a seal which is both mechanically strong and hermetic, to avoid scarring or burning of the surfaces when plastic members are used, to provide a method of sealing which is easy to use, rapid, inexpensive, and allows the use of inexpensive materials.

It is a further object of the present invention to provide an improved construction of an entry spike-drip barrel assembly incorporating an airway for use in the administration of aparenteral solutions.

Another object of the present invention is to provide an improved spike-drip barrel assembly in which the rigid spike member has an annular axial projection that is deformed by ultrasonic heating means into locked engagement with an annular flange on the flexible drip barrel member, thereby to effect a hermetically sealed coupling between the components.

For a better understanding of the nature and objects of the invention, reference is made to the following detailed description along with the accompanying drawings.

In accordance with the present invention, it is possible to join two synthetic plastic members in sealing engagement wherein one member is made of rigid or semi-rigid synthetic plastic material and the other member is made of flexible synthetic plastic material. This is accomplished by supporting the rigid synthetic plastic member on a suitable base with a hollow ultrasonic horn directed over the member and contacting the top surface of a projecting portion of that member. The flexible synthetic plastic member lies within the hollow space of the horn and rests on a portion of the rigid member and in touching relationship with a part of the projecting portion of the rigid member. Ultrasonic energy is directed on the tip of the projecting portion while the horn moves down. The rigid projecting portion progressively softens and folds over by virtue of the shape imparted to it from the shaped horn, thereby making contact with the sealing area of the flexible synthetic plastic member. Ultrasonic energy is continued to be applied briefly to provide more heat to the rigid synthetic plastic portion to cause the contacting surfaces of the rigid and flexible synthetic plastic portions to fuse. The ultrasonic energy is then interrupted to allow the joint to cool.

The method produces not only a tight, strong mechanical seal between the two members resulting from the deformation or folding over of the projecting portion onto the mating portion of the other member, but the method simultaneously results in a fusion of a portion of the contacting surfaces between the two members sufficient to assure a hermetic seal. In cases where subsequent storage or use conditions will not deform either member, fusion of the members would not be necessary to produce a hermetic seal.

Figure 1:
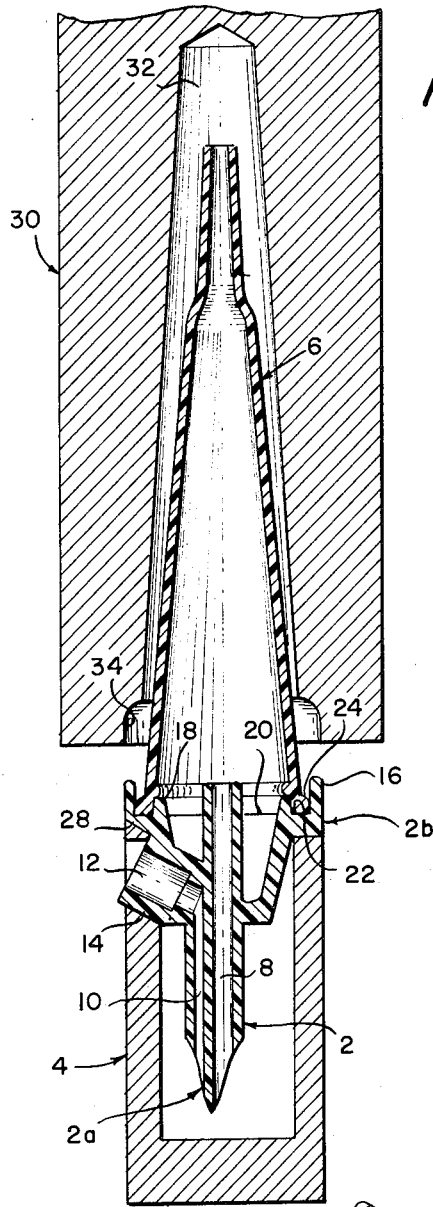
FIG. 1 is an axial cross-sectional view showing the relationship of two members of a spike-drip barrel assembly and an ultrasonic horn prior to sealing a joint between said members.
Figure 2:
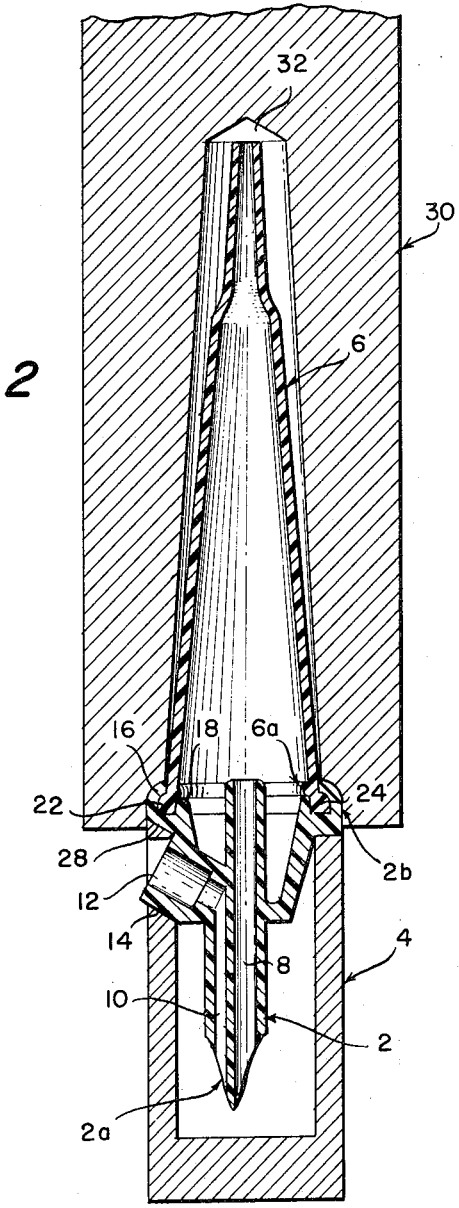
FIG. 2 is a corresponding view illustrating the sealed joint resulting from the application of sonic energy and with the horn in contact with said joint.

As an example of the method of sonic sealing of this invention, reference is made to FIGS. 1 and 2, wherein an entry spike member 2 having a pointed end 2a and a base end 2b is supported on a suitable supporting base 4 and a drip barrel member 6 is arranged on spike member 2. The spike member 2 is made of a rigid or semi-rigid synthetic plastic material, such as Cycolac (acrylonitrile-butadiene-styrene copolymer), Lexan (poly-carbonate), high density polyethylene or polypropylene, or any other polymer with characteristics which impart a reasonable degree of rigidity as well as flow and sealing properties. In this particular embodiment of the spike member 2, Cycolac is a preferred material.

Figure 3:
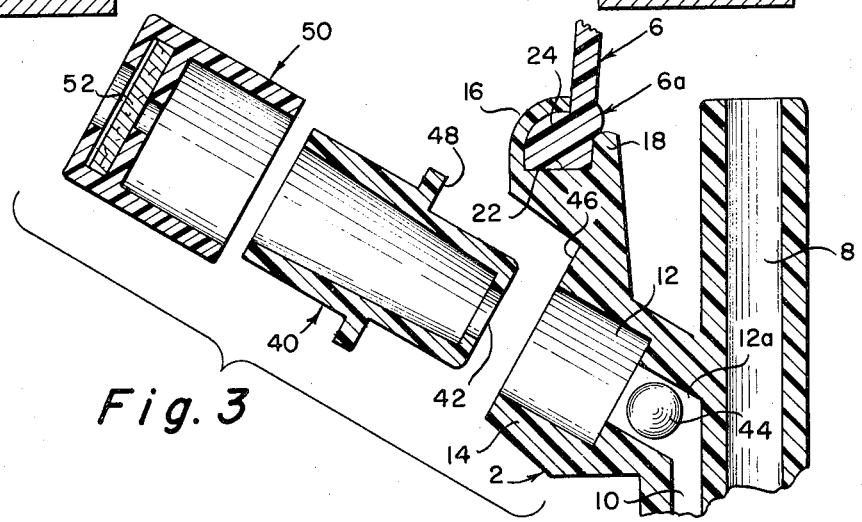
FIG. 3 is a detailed exploded sectional view of the valve means and air filter plug means associated with the spike member of FIGS. 1 and 2.

The spike member 2 is generally tubular and contains a hollow conduit 8 providing passageway for parenteral solutions and an airway conduit 10 which communicates with a cylindrical chamber 12 of the airway housing 14. As shown in FIG. 3, the chamber 12 is adapted to receive a check-valve member and a retaining air filter plug which may be installed before or after the sealing connection of spike member 2 to drip barrel member 6. A pair of spaced concentrically arranged annular axial projections 16, 18 project upwardly from the base end 20 of the spike member 2, said projections defining therebetween an annular flat end surface 22.

The drip barrel 6 is made of a flexible, preferably transparent synthetic plastic material, such as clear polyvinyl, polyethylene or polypropylene which may contain a plasticizer to impart greater flexibility. It has a base end of appropriate diameter provided at its extremity with an external annular flange 24 that defines an annular end surface the width of which corresponds with that of the flat surface 22 between the outer and inner flanges 16 and 18, whereby the flanged end 24 of the drip barrel rests snugly in the cavity between flanges 16 and 18.

Several examples of suitable combinations of a rigid plastic member with a flexible plastic member are:

(a) High density polyethylene-low density polyethylene;
(b) Rigid polyvinylchloride-plasticized polyvinyl chloride;
(c) Cycolac-plasticized polyvinyl chloride;
(d) Polymethylmethacrylate-plasticized polyvinyl chloride;
(e) Acrylonitrile-styrene copolymer-plasticized polyvinyl chloride.

The supporting base 4 is hollow to accommodate the spike member 2 and has a cutout portion in the area where the airway housing 14 exists on the spike member 2. The surface 28 which slopes away from the housing 14 is supported by an extension (not shown) on the supporting base 4 so as to provide complete support to the entire spike member 2.

The ultrasonic horn 30, attached to a suitable source of ultrasonic energy, contains a cylindrical chamber 32 that accommodates drip barrel 6. The lower end of horn 30 is counterbored to define a surface 34 which has a diameter at its lowest and widest circumference exactly the same as the diameter of the spike member 2 at the outside surface of outer flange 16.

In operation, with the spike member 2 supported on base 4 and the drip barrel 6 resting on the spike member 2 as shown in FIG. 1, the sonic horn 30 is brought to bear on the top edges of annular flange 16 by means of pneumatic pressure exerted on the horn 30. The horn 30 is connected with an ultrasonic energy converter (not shown) which converts high frequency electrical energy from a generator (not shown) into sonic energy in the form of mechanical oscillations. These oscillations cause the horn 30 to vibrate along its longitudinal axis. The preferred frequency is about 20,000 cycles per second although higher or lower frequencies can be used, e.g., as low as 16,000 c.p.s. However, noise levels become intolerable at this lower range. The pneumatic pressure forcing the horn against the workpiece is on the order of 10 to 110 pounds per square inch.

At the time of contact between the horn 30 and the flange 16, the sonic energy source is actuated while the horn continues in a downward direction for a matter of several tenths of a second or so. During this time, the ultrasonic energy is dissipated in the form of heat causing the flange 16 to soften and curve inwardly around and make contact with external flange 24 of the drip barrel 6 as shown in FIG. 2. Sonic energy is continued to be applied to the curved surface of the flange 16 for several more tenths of a second. During this period of time, some of the heat thus generated penetrates all the way through the flange and dissipates partially into external flange 24 causing the surface of this extension to soften and mix with the softened contacting surface of the flange 16. The energy source is terminated, the horn dissipates heat from the joint causing it to cool, and a hermetic seal at the interface of the curved flange 16 and external flange 24 is effected as well as a tight mechanical seal between the rigid and flexible members. This seal, being hermetic, prevents the passage of pyrogens and bacteria through this part of the assembled unit.

It will be observed that with the method of ultrasonic sealing of this invention, no direct support of the flexible plastic member is used. That is, neither the base support nor the sonic horn comes into contact with this member and essentially no deformation of the flexible plastic member occurs.

In most applications of sealing two members via sonic energy as disclosed in the prior art, one member is supported in abutting relationship to the other member while the ultrasonic horn bears against this other member. These members must be relatively rigid. If either or both were flexible, then pressures exerted directly against the two members via the supporting base and the horn, can result in deformation of the flexible member and produce an imperfect seal between the members.

In the method of ultrasonic sealing of this invention, the desired objectives are met. First, a mechanically strong and hermetic seal is obtained between two members which are not the same chemically and which have dissimilar physical properties. For example, in the entry spike-drip barrel assembly, one member is rigid and the other is flexible; one is made of Cycolac, the other is polyvinyl chloride; one member (Cycolac) has a melt temperature considerably higher (about 425–500° F.) than the melt temperature (about 320–385° F.) of the other member (polyvinyl chloride). The seal thus produced assures freedom from contaminants entering between the sealed surfaces of the two members. Furthermore, the method is rapid, inexpensive, and permits the use of inexpensive synthetic plastic materials.

By the principle of ultrasonic sealing a rigid member to a flexible member according to this invention, wherein one member is not supported directly by either a support base or an ultrasonic horn, such members need not necessarily be made of synthetic plastic. One member could be of a rigid material such as glass or metal and the other member could be a flexible polymeric substance. In these situations, when the member, which is to make contact with an ultrasonic horn and is softened, has a shape which can be uniformly supported, then a tight mechanical seal may be formed which is also hermetic without having chemical interaction between contacting surfaces.

In some situations, however, a purely strong mechanical seal can be formed through ultrasonic energy which may not necessarily be hermetic. A hermetic seal alone if not accompanied by mechanically securing of the parts, will not always provide a seal which resists mechanical stresses and hence can separate. Thus, with situations as illustrated in the above example, such as the example of sealing an entry spike to a drip barrel, the combination of a mechanically strong and hermetic seal is achieved which will withstand strains and stresses imposed upon it.

The method of ultrasonic sealing as set forth in this invention is not limited to the specific example given in detail above. It may also be used to produce joints by sealing a rigid plastic member to a glass, metal or rigid plastic member in certain medical and scientific apparatuses where a joint capable of maintaining its integrity under reduced or increased pressures is desired. It may be used to make a tight seal between a flexible plastic bulb and a rigid plastic tube (as for example, in syringes). It may be used to form a hermetic seal between a rigid plastic tube and a male metal connector for a needle in a hypodermic syringe. It may be used to form a vacuum seal between the interior plastic or glass liner and the exterior plastic body of a vacuum bottle.

Referring now to FIG. 3, the chamber 12 is adapted to receive the valve housing 40 containing a valve seat opening 42 that is adapted for closure by the one-way ball check valve 44, thereby to close the airway conduit 10 when the back pressure exceeds a desired value. The valve housing is adapted to be permanently secured to the spike body 2, for example, by sonic welding of the surfaces 46 and 48. An air filter housing 50 is adapted for concentric mounting upon the valve housing 40, said housing 50 containing a bacterial filter 52. Preferably the valve housing and the filter housing are formed of the same material, such as Cycolac. The valve member 44 may be formed of metal, rubber or suitable synthetic plastic material, the diameter of said member being greater than that of the opening 42. In the alternative, other suitable valve closure means, such as a resilient disk, may be used equally as well.

What is claimed is:

1. An ultrasonic method for joining a first hollow member formed of rigid heat flowable material to a second hollow member formed of heat flowable, pressure deformable material considerably more flexible than the heat flowable material of the first hollow member, the first hollow member having a radial surface and continuous projection extending axially from the periphery of the radial surface and the second hollow member having a radially extending flange dimensioned to fit within the projection of the first hollow member in abutting contact with the radial surface, which comprises the steps of (1) supporting the first member in a relatively fixed position;
    (2) placing the radially extending flange of the second hollow member in abutting relation with the radial surface of the first hollow member such that the continuous projection extends axially beyond the radially extending flange;
    (3) applying sufficient ultrasonic energy to the free extremities of the continuous projection to heat the projection to a pliable condition;
    (4) applying a radial force inwardly evenly along the entire circumference of the continuous projection simultaneously with step (3) to deform the continuous projection inwardly;
    (5) applying an axial force evenly along the entire circumference of the continuous projection in a direction toward the radially extending flange simultaneously with steps (3) and (4) to deform the projection into gripping relation with the radial flange of the second member; and
    (6) terminating step (3) to permit the continuous projection to rigidify in the inwardly gripping position around the radial flange.

2. The method of claim 1, wherein said first member is formed of a relatively rigid thermoplastic material, and said second member is formed of a relatively flexible synthetic plastic material.

3. The method of claim 1, wherein said first and second members are formed of thermoplastic and non-thermoplastic materials, respectively.

4. The method as defined in claim 3, wherein said relatively rigid thermoplastic material comprises acrylonitrile-butadiene-styrene polymer, and said relatively flexible plastic material comprises plasticized polyvinyl chloride.

5. The method as defined in claim 3, wherein said second member is formed of glass.

6. The method as defined in claim 1, wherein said first member is high density polyethylene and said second member is plasticized polyethylene.

7. A method as defined in claim 1 further including the step of applying ultrasonic energy to the projection of the first hollow member for a sufficient time following commencement of step (5) to heat the radially extending flange of the second hollow member to cause fusion of the continuous projection and radial flange, thereby forming a hermetic seal between the first and second hollow members.

8. The method as defined in claim 7, wherein said first and second members are formed of chemically compatible materials that produce a cohesive bond between said two materials.

9. A method for forming a hermetic seal between a first hollow member and a second hollow member with ultrasonic energy, comprising the steps of (1) forming the first hollow member of rigid heat flowable material in a shape having a radial surface and a continuous projection extending axially from the periphery of the radial surface;
    (2) forming the second hollow member of pressure deformable heat flowable material considerably more flexible than the heat flowable material of the first hollow member in a shape having a radially extending flange dimensioned to fit within the continuous projection of the first hollow member in abutting contact with the radial surface thereof;
    (3) supporting the first hollow member in a relatively fixed position;
    (4) placing the radially extending flange of the second hollow member in abutting relation with the radial surface of the first hollow member such that the continuous projection extends axially beyond the radially extending flange;
(5) applying sufficient ultrasonic energy to the free extremities of the continuous projection to heat the projection to a pliable condition;
(6) applying a radial force inwardly evenly along the entire circumference of the continuous projection simultaneously with step (5) to deform the continuous projection inwardly;
(7) applying an axial force evenly along the entire circumference of the projection in a direction toward the radially extending flange simultaneously with steps (5) and (6) to deform the projection into gripping relation with the radial flange of the second member;
(8) continuing the application of ultrasonic energy for a time sufficient to cause fusion of the continuous projection of the first hollow member with the radial flange of the second hollow member; and
(9) terminating step (8) to permit the projection to rigidify in the inwardly gripping position around the radial flange.

10. The method of claim 9 which include encasing said second member in an ultrasonic horn and displacing said ultrasonic horn against said continuous projection while preventing contact between said horn and second member.

References Cited
UNITED STATES PATENTS

| | | | |
|---|---|---|---|
| 3,367,809 | 2/1968 | Soloff | 228—1 |
| 1,213,760 | 1/1917 | Dimick | 29—470.3 |
| 3,483,066 | 12/1969 | Harris et al. | 156—73 |
| 2,779,998 | 2/1957 | Bailey | 29—470.3 |
| 2,270,926 | 1/1942 | Briegel et al. | 285—382 |
| 3,374,014 | 3/1968 | Kull et al. | 285—382 |
| 3,441,293 | 4/1969 | Bagnulo | 285—382 |

DOUGLAS J. DRUMMOND, Primary Examiner

U.S. Cl. X.R.

29—470.3; 285—331, 382, 423